US009773159B2

United States Patent
Lee et al.

(10) Patent No.: US 9,773,159 B2
(45) Date of Patent: Sep. 26, 2017

(54) METHOD AND APPARATUS FOR EXTRACTING IMAGE FEATURE

(71) Applicant: Samsung Electronics Co., Ltd., Suwon-si, Gyeonggi-do (KR)

(72) Inventors: Changkyo Lee, Seoul (KR); Byungin Yoo, Seoul (KR); Namjoon Kim, Anyang-si (KR); Jaejoon Han, Seoul (KR)

(73) Assignee: SAMSUNG ELECTRONICS CO., LTD., Gyeonggi-do (KR)

( * ) Notice: Subject to any disclaimer, the term of this patent is extended or adjusted under 35 U.S.C. 154(b) by 12 days.

(21) Appl. No.: 14/812,252

(22) Filed: Jul. 29, 2015

(65) Prior Publication Data

US 2016/0078282 A1 Mar. 17, 2016

(30) Foreign Application Priority Data

Sep. 16, 2014 (KR) ........................ 10-2014-0122597

(51) Int. Cl.
*G06K 9/00* (2006.01)
*G06K 9/62* (2006.01)
*G06K 9/46* (2006.01)

(52) U.S. Cl.
CPC ....... *G06K 9/00268* (2013.01); *G06K 9/6202* (2013.01); *G06K 9/6277* (2013.01); *G06K 9/4642* (2013.01); *G06K 2009/4666* (2013.01)

(58) Field of Classification Search
CPC ............. G06K 9/00228; G06K 9/0022; G06K 9/00288; G06K 9/00281; G06K 9/00248
USPC ................... 382/100, 103, 118, 173
See application file for complete search history.

(56) References Cited

U.S. PATENT DOCUMENTS

| 6,711,293 B1 | 3/2004 | Lowe | |
| 8,503,801 B2* | 8/2013 | Schiller | G06T 11/60 382/228 |
| 8,559,670 B2* | 10/2013 | Wang | G06K 9/00771 382/103 |

(Continued)

FOREIGN PATENT DOCUMENTS

| JP | 2006310999 A | 11/2006 |
| JP | 2010015555 A | 1/2010 |

(Continued)

OTHER PUBLICATIONS

B. Fröba, "Face detection with the modified census transform", Proceedings of the Sixth IEEE International Conference on Automatic Face and Gesture Recognition, (FGR'04), May 17, 2004 6 pgs.

(Continued)

*Primary Examiner* — Sheela C Chawan
(74) *Attorney, Agent, or Firm* — Harness, Dickey & Pierce, P.L.C.

(57) ABSTRACT

At least one example embodiment discloses an image feature extracting method. The method includes determining a probabilistic model based on pixel values of pixels in a kernel, determining image feature information of a current pixel of the pixels in the kernel and determining whether to change the image feature information of the current pixel based on a random value and a probability value of the current pixel, the probability value being based on the probabilistic model.

13 Claims, 8 Drawing Sheets

(56) References Cited

U.S. PATENT DOCUMENTS

| | | | |
|---|---|---|---|
| 8,649,599 B2 | 2/2014 | Yamada | |
| 8,666,179 B2 | 3/2014 | Suzuki et al. | |
| 8,705,810 B2 * | 4/2014 | Wang | G06F 17/30781 |
| | | | 382/103 |
| 8,712,109 B2 * | 4/2014 | Hua | G06K 9/00281 |
| | | | 382/118 |
| 8,831,293 B2 * | 9/2014 | Wolf | G06F 19/24 |
| | | | 382/118 |
| 8,908,976 B2 * | 12/2014 | Kawanishi | G06K 9/00228 |
| | | | 382/118 |
| 2011/0235910 A1 * | 9/2011 | Soceanu | G06K 9/00295 |
| | | | 382/173 |
| 2013/0129233 A1 † | 5/2013 | Schiller et al. | |

FOREIGN PATENT DOCUMENTS

| | | | |
|---|---|---|---|
| JP | 2013114518 A | 6/2013 | |
| KR | 20110006030 A | 1/2011 | |
| KR | 1178333 B1 | 8/2012 | |
| KR | 1326230 B1 | 11/2013 | |
| WO | WO-2004003848 A2 | 1/2004 | |

OTHER PUBLICATIONS

T. Ojala, "A comparative study of texture measures with classification based on featured distributions", PatternRecoonition, vol. 29, No. I, 9 pgs, 1996, Elsevier Science Ltd.

N. Dalal, "Histograms of oriented gradients for human detection", International Conference on Computer Vision & Pattern Recognition (CVPR '05), Jun. 2005, San Diego, United States. IEEE Computer Society, 1, 8 pgs.

\* cited by examiner
† cited by third party

FIG. 4

| 80 | 100 | 20 |
|---|---|---|
| 110 | 50 | 210 |
| 40 | 20 | 100 |

410

→

| 30 | 50 | -30 |
|---|---|---|
| 60 | 0 | 160 |
| -10 | -30 | 50 |

METHOD AND APPARATUS FOR EXTRACTING IMAGE FEATURE

CROSS-REFERENCE TO RELATED APPLICATION

This application claims the priority benefit of Korean Patent Application No. 10-2014-0122597, filed on Sep. 16, 2014, in the Korean Intellectual Property Office, the disclosure of which is incorporated herein by reference in its entirety.

BACKGROUND

1. Field

At least some example embodiments relate to technology for processing an image.

2. Description of the Related Art

In general, a process of recognizing information from an input image may include extracting an image feature from the image and recognizing the information from the input image based on the image feature. The image feature to be extracted from the image may include, for example, a scale-invariant feature transform (SIFT), a histogram of oriented gradient (HOG), haar, ferns, a local binary pattern (LBP), and a modified census transform (MCT). Such image features may indicate identical feature values with respect to identical patterns of an input image, and a recognizer may perform image recognition based on the features.

SUMMARY

At least one example embodiment relates to an image feature extracting method.

According to an example embodiment, an image feature extracting includes determining a probabilistic model based on pixel values of pixels in a kernel, determining image feature information of a current pixel of the pixels in the kernel, and determining whether to change the image feature information of the current pixel based on a random value and a probability value of the current pixel, the probability value being based on the probabilistic model.

At least some example embodiments provide that the determining the probabilistic model may include determining a probability parameter based on a difference between a pixel value of a central pixel of the pixels and a pixel value of each pixel of the pixels in the kernel, the central pixel being at a center of the kernel, and determining the probabilistic model by applying the probability parameter to a probability distribution function.

At least some example embodiments provide that the probability value of the current pixel based on a value of the difference between the pixel value of the central pixel of the pixels and a pixel value of the current pixel, a weighted value and the probabilistic model, the central pixel being at a center of the kernel.

At least some example embodiments provide that the determining the probabilistic model may include determining a probability parameter based on a difference between a mean pixel value of the pixels in the kernel and a pixel value of each pixel of the pixels in the kernel, and determining the probabilistic model by applying the probability parameter to a probability distribution function.

At least some example embodiments provide that the probability value of the current pixel based on a value of the difference between the mean pixel value of the pixels in the kernel and the pixel value of the current pixel, a weighted value and the probabilistic model.

At least some example embodiments provide that the determining whether to change the image feature information of the current pixel may include changing the image feature information of the current pixel if the probability value of the current pixel is greater than the random value, and maintaining the image feature information of the current pixel when the probability value of the current pixel is less than or equal to the random value.

At least one example embodiment relates to an image feature extracting method.

According to another example embodiment, an image feature extracting method includes determining a gradient angle and a gradient magnitude of a current pixel, determining a bin in a histogram to determine a histogram of orientation gradient (HOG) feature, the bin corresponding to the gradient angle, and determining whether to re-determine the bin based on a probability value of a probabilistic model and the gradient magnitude.

At least some example embodiments provide that the determining whether to re-determine the bin may include determining whether to re-determine the bin by comparing the probability value to a random value.

At least some example embodiments provide that the determining whether to re-determine the bin may include re-determining the bin corresponding to the gradient angle of the current pixel using a normal random deviation when the probability value is greater than the random value, and maintaining the bin if the probability value is less than or equal to the random value.

At least one example embodiment relates to a face recognition method.

According to an example embodiment, a face recognition method includes facial a facial landmark from an input image, determining image feature information of the detected landmark based on a probabilistic model, and performing face recognition based on the image feature information of the facial landmark.

At least some example embodiments provide that the determining the image feature information of the landmark may include determining the image feature information of the landmark based on a pixel value of a pixel, the pixel being in a region of the landmark, and determining whether to change the image feature information based on a random value and a probability value, the probability value being based on the probabilistic model.

At least some example embodiments provide that the determining whether to change the image feature information may include determining to change the image feature information of the landmark if the probability value is greater than the random value, and determining to maintain the image feature information of the landmark if the probability value is less than or equal to the random value.

At least one example embodiment relates to an image feature extracting apparatus.

According to an example embodiment, an image feature extracting apparatus includes a probabilistic model determiner configured to determine a probabilistic model to be applied to a current pixel included in an input image, and an image feature determiner configured to determine image feature information of the current pixel based on the probabilistic model.

At least some example embodiments provide that the image feature determiner may determine whether to change the image feature information of the current pixel by comparing, to a random value, a probability value of the current pixel determined based on the probabilistic model.

At least some example embodiments provide that the probabilistic model determiner may determine the probabilistic model based on pixel values of pixels included in a kernel, and determine the probability value of the current pixel based on a value of a difference between a pixel value of a central pixel located at a center of the kernel and a pixel value of the current pixel.

At least some example embodiments provide that the probabilistic model determiner may determine the probabilistic model based on the pixel values of the pixels included in the kernel, and determine the probability value of the current pixel based on a value of a difference between a mean pixel value of the pixels included in the kernel and the pixel value of the current pixel.

At least some example embodiments provide that the image feature determiner may determine a gradient angle and a gradient magnitude of the current pixel, determine a bin corresponding to the gradient angle in a histogram to determine a HOG image feature, and determine whether to re-determine a bin corresponding to the gradient angle of the current pixel based on a probability value of a probabilistic model to which the gradient magnitude is applied.

Additional aspects of example embodiments will be set forth in part in the description which follows and, in part, will be apparent from the description, or may be learned by practice of the disclosure.

BRIEF DESCRIPTION OF THE DRAWINGS

These and/or other aspects will become apparent and more readily appreciated from the following description of example embodiments, taken in conjunction with the accompanying drawings of which:

FIG. 4 illustrates an example of determining a probabilistic model to extract a local binary pattern (LBP) image feature according to at least one example embodiment;

DETAILED DESCRIPTION

Figure 1:
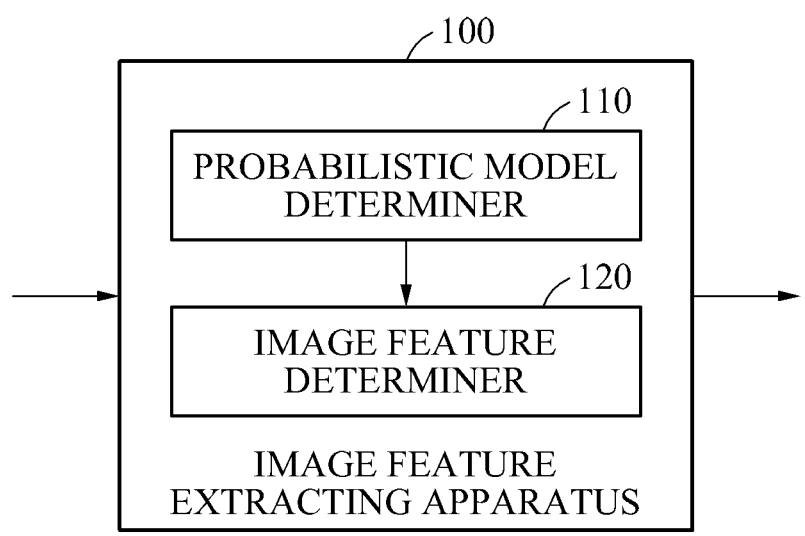
FIG. 1 illustrates a configuration of an image feature extracting apparatus according to at least one example embodiment.

Reference will now be made in detail to embodiments, examples of which are illustrated in the accompanying drawings, wherein like reference numerals refer to like elements throughout. Example embodiments are described below to explain the present disclosure by referring to the figures.

In the drawings, the thicknesses of layers and regions are exaggerated for clarity. Like reference numerals in the drawings denote like elements.

Detailed illustrative embodiments are disclosed herein. However, specific structural and functional details disclosed herein are merely representative for purposes of describing example embodiments. Example embodiments may be embodied in many alternate forms and should not be construed as limited to only those set forth herein.

It should be understood, however, that there is no intent to limit this disclosure to the particular example embodiments disclosed. On the contrary, example embodiments are to cover all modifications, equivalents, and alternatives falling within the scope of the example embodiments. Like numbers refer to like elements throughout the description of the figures.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of this disclosure. As used herein, the term "and/or," includes any and all combinations of one or more of the associated listed items.

It will be understood that when an element is referred to as being "connected," or "coupled," to another element, it can be directly connected or coupled to the other element or intervening elements may be present. In contrast, when an element is referred to as being "directly connected," or "directly coupled," to another element, there are no intervening elements present. Other words used to describe the relationship between elements should be interpreted in a like fashion (e.g., "between," versus "directly between," "adjacent," versus "directly adjacent," etc.).

The terminology used herein is for the purpose of describing particular embodiments only and is not intended to be limiting. As used herein, the singular forms "a," "an," and "the," are intended to include the plural forms as well, unless the context clearly indicates otherwise. It will be further understood that the terms "comprises," "comprising," "includes," and/or "including," when used herein, specify the presence of stated features, integers, steps, operations, elements, and/or components, but do not preclude the presence or addition of one or more other features, integers, steps, operations, elements, components, and/or groups thereof.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Various example embodiments will now be described more fully with reference to the accompanying drawings in which some example embodiments are shown.

FIG. 1 illustrates a configuration of an image feature extracting apparatus 100 according to at least one example embodiment.

The image feature extracting apparatus 100 may extract an image feature from an input image. The input image may be a color image or a gray image. When the color image is input to the image feature extracting apparatus 100, the image feature extracting apparatus 100 may convert the color image to various channel images based on a color space and extract an image feature based on the channel images. For example, the color image may be converted to gray, blue, green, and red channel images.

The image feature extracting apparatus 100 may extract image feature information, for example, a local binary pattern (LBP), a modified census transform (MCT), and a histogram of oriented gradient (HOG), from the input image. The image feature information extracted by the image feature extracting apparatus 100 may be used for recognition of a face, an object, a posture, or a scene.

In general, a process of recognizing information from an image may include extracting an image feature from an input image and recognizing the information based on the extracted image feature by a recognizer. In addition, a process of training the recognizer may include extracting an image feature from a training image and training the recognizer based on the extracted image feature. In the processes described in the foregoing, the image feature extracting apparatus 100 may be used to extract the image feature from the input image or the training image.

The image feature extracting apparatus 100 may extract a pixel-level shape feature from an image using statistical modeling. For example, the image feature extracting apparatus 100 may extract an image feature, for example, an LBP, an MCT, and a HOG, from an image using a probabilistic model based on a Gaussian probability distribution function (Gaussian PDF) or a normal distribution function.

The image feature extracting apparatus 100 may generate various training data using the statistical modeling, and improve a recognition rate of a recognizer by modeling noise that may occur in an actual recognition process. Using the statistical modeling may enable extraction of various image features based on a pattern of an input image. When a pixel-level image feature is extracted by the image feature extracting apparatus 100, a result of extracting the image feature may be changed by a probabilistic model that follows a certain distribution.

Referring to FIG. 1, the image feature extracting apparatus 100 includes a probabilistic model determiner 110 and an image feature determiner 120.

The probabilistic model determiner 110 may determine a probabilistic model to be applied to a current pixel included in an input image. For example, the probabilistic model determiner 110 may determine the probabilistic model to be applied to the current pixel among various probabilistic models including a Gaussian PDF and a normal distribution function. The current pixel may refer to a pixel from which an image feature is to be extracted among all pixels included in the input image. The probabilistic model determiner 110 may adjust a maximum probability value that may be associated with the probabilistic model by applying a weighted value to the probabilistic model.

The image feature determiner 120 may determine image feature information of the current pixel based on the probabilistic model. For example, the image feature determiner 120 may determine the image feature information about an image feature, for example, an LBP, an MCT, and a HOG, based on a pixel value of the current pixel. The image feature determiner 120 may then determine whether to change the determined image feature information of the current pixel. For example, the image feature determiner 120 may change the image feature information of the current pixel by comparing, to a random value, a probability value of the current pixel determined based on the probabilistic model. The random value may be randomly determined based on a uniform distribution, and determined in a range between "0" and the maximum probability value that may be associated with the probabilistic model.

The LBP image feature may be an index value obtained by encoding, as a binary number, a relative brightness change in an area adjacent to the current pixel, and be image feature information obtained by comparing a pixel value of a central pixel in a kernel to a pixel value of an adjacent pixel in the kernel and mapping 1 or 0. The MCT image feature may be an index value obtained by encoding, as a binary number, a difference between a brightness value of the current pixel and a mean brightness value of a local area including the current pixel, and be image feature information obtained by comparing a mean pixel value of pixels included in the kernel to the pixel value of the adjacent pixel and mapping 1 or 0. The HOG image feature may indicate a vector connecting, in a line, bin values of histograms, which is obtained by dividing a target area into predetermined sized cells and obtaining a histogram with respect to an orientation of an edge pixel in each cell. The edge pixel may refer to a pixel having a gradient magnitude greater than a predetermined magnitude.

A process of determining each of the LBP image feature, the MCT image feature, and the HOG image feature by the image feature extracting apparatus 100 from an input image will be described hereinafter.

<Example of Determining an LBP Image Feature by the Image Feature Extracting Apparatus 100>

When an image is input, the probabilistic model determiner 110 may determine a probabilistic model as a statistical model based on sampling of a predetermined and/or selected area. A kernel may be used for the sampling. The probabilistic model determiner 110 may determine the probabilistic model based on pixel values of pixels included in the kernel. The kernel may be defined as an area including a plurality of pixels. Here, an area to be used to generate the probabilistic model from the input image may be sampled based on the kernel. The kernel may be set for a single image or a plurality of images. A detailed description will be provided with reference to FIG. 2.

The probabilistic model determiner 110 may determine a probability parameter based on a difference between a pixel value of a central pixel located at a center of the kernel and a pixel value of each pixel included in the kernel, and apply the determined probability parameter to a probability distribution function to determine the probabilistic model to be applied to the current pixel. The probability parameter may include a mean and a standard deviation to be applied to the probabilistic model. A form of the probabilistic model may be determined by the probability parameter.

The probabilistic model determiner 110 may calculate a value of the difference, or a distance, between the pixel value of the central pixel located at the center of the kernel among the pixels included in the kernel and the pixel value of each pixel included in the kernel, and calculate a mean and a standard deviation of the calculated values of the difference. The mean and the standard deviation of the values of the difference may be calculated using a general method that is widely used in a related technical field. The probabilistic model determiner 110 may determine the probabilistic model to be applied to the current pixel by applying the mean and the standard deviation of the values of the difference to a Gaussian PDF expressed as Equation 1.

$$P(x \mid \mu, \sigma) = \frac{1}{\sigma\sqrt{2\pi}} \exp\left(-\frac{(x-\mu)^2}{2\sigma^2}\right) \quad \text{[Equation 1]}$$

In Equation 1, "μ" and "σ" denote the mean and the standard deviation of the values of the difference, respectively. "P(x|μ, σ)" denotes a probability value associated with a variable "x" when the mean is μ and the standard deviation is σ.

Figure 4:
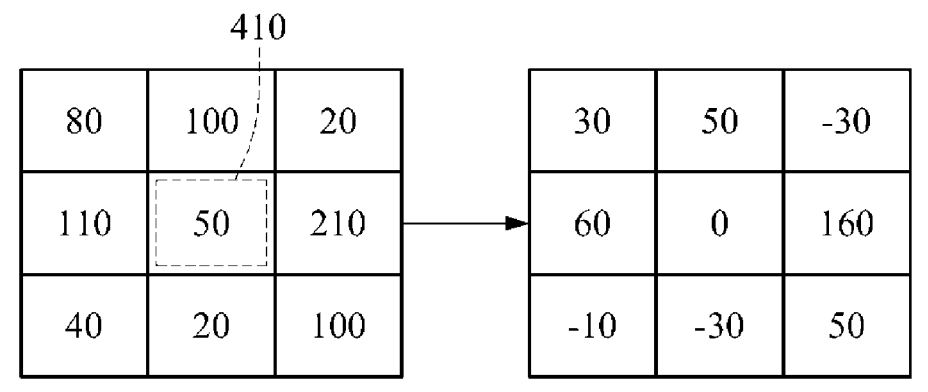

For example, when a kernel area including nine pixels is set as illustrated in FIG. 4, the probabilistic model determiner 110 may calculate a difference between a pixel value of a central pixel among the nine pixels included in the kernel and a pixel value of each pixel in the kernel. When respective pixel values of the nine pixels in the kernel are given as illustrated by the left portion of FIG. 4, the probabilistic model determiner 110 may calculate a value of a difference between a pixel value "50" of a central pixel 410 and a pixel value of each pixel in the kernel. Values obtained by subtracting the pixel value 50 of the central pixel 410 from the pixel values of the nine pixels in the kernel are illustrated by the right portion of FIG. 4. The probabilistic model determiner 110 may calculate a mean and a standard deviation of the values of the difference between the pixels in the kernel, for example, 30, 50, −30, 60, 0, 160, −10, −30, and 50, and determine a probabilistic model by applying the calculated mean and the standard deviation to the probability distribution function expressed as Equation 1.

Referring back to FIG. 1, the probabilistic model determiner 110 may control a maximum probability value that may be associated with the probabilistic model by applying a weighted value to the probabilistic model. For example, the probabilistic model determiner 110 may adjust the maximum probability value of the probabilistic model by multiplying Equation 1 by the weighted value, which is a constant. A detailed description will be provided with reference to FIG. 3.

The image feature determiner 120 may determine the image feature information about the LBP image feature of the current pixel. The image feature determiner 120 may determine the image feature information of the current pixel by comparing the pixel value of the central pixel located at the center of the kernel to the pixel value of the current pixel. For example, when the pixel value of the current pixel is greater than the pixel value of the central pixel, the image feature determiner 120 may set the image feature information of the current pixel to be "1." Conversely, when the pixel value of the current pixel is less than or equal to the pixel value of the central pixel, the image feature determiner 120 may set the image feature information of the current pixel to be "0."

When the image feature information of the current pixel is determined, the image feature determiner 120 may determine whether to change the image feature information determined with respect to the current pixel based on the probabilistic model determined by the probabilistic model determiner 110. When the probability value of the current pixel determined based on the probabilistic model satisfies a predetermined and/or selected condition, the image feature determiner 120 may change the image feature information determined with respect to the current pixel. Conversely, when the probability value of the current pixel does not satisfy the predetermined and/or selected condition, the image feature determiner 120 may maintain the image feature information of the current pixel.

The image feature determiner 120 may determine whether to change the image feature information of the current pixel by comparing, to the random value, the probability value of the current pixel determined based on the probabilistic model. The probability value of the current pixel may be determined by applying, to the probabilistic model, the value of the difference between the pixel value of the central pixel in the kernel and the pixel value of the current pixel and the weighted value. For example, the value of the difference between the pixel value of the central pixel in the kernel and the pixel value of the current pixel may be input as the variable x of Equation 1, and a value obtained by multiplying a resulting value from Equation 1 by the weighted value may be determined to be the probability value of the current pixel.

When the probability value of the current pixel is greater than the random value, the image feature determiner 120 may change the image feature information determined with respect to the current pixel. Conversely, when the probability value of the current pixel is less than or equal to the random value, the image feature determiner 120 may maintain the image feature information determined with respect to the current pixel. For example, when the image feature information about the LBP image feature determined with respect to the current pixel is "1" and the probability value of the current pixel determined based on the probabilistic model is greater than the random value, the image feature determiner 120 may change the image feature information of the current pixel to be an inverse value "0." Conversely, when the probability value of the current pixel is less than or equal to the random value, the image feature determiner 120 may maintain the image feature information of the current pixel to be "1" and perform an operation of determining an LBP image feature of another pixel.

When the LBP image feature of the current pixel is determined, the image feature extracting apparatus 100 may determine an LBP image feature of other pixels in the kernel. When the LBP image feature of all pixels in the kernel is determined, the image feature extracting apparatus 100 may determine an LBP image feature of pixels included in another kernel.

<Example of Determining an MCT Image Feature by the Image Feature Extracting Apparatus 100>

When an image is input, the probabilistic model determiner 110 may determine a probabilistic model as a statistical model based on sampling of a predetermined and/or selected area. In a process of extracting an MCT image feature, a kernel may be used for the sampling of the area. The probabilistic model determiner 110 may determine the probabilistic model based on pixel values of pixels included in the kernel. The kernel may be set for a single image or a plurality of images. A detailed description will be provided with reference to FIG. 2.

The probabilistic model determiner 110 may determine a probability parameter based on a difference between a mean pixel value of the pixels included in the kernel and a pixel value of each pixel included in the kernel. The probability parameter may include a mean and a standard deviation to be applied to the probabilistic model. The probabilistic model determiner 110 may determine the probabilistic model to be applied to a current pixel by applying the determined probability parameter to a probability distribution function.

The probabilistic model determiner 110 may calculate a value of the difference, or a distance, between the mean pixel value of the pixels included in the kernel and the pixel value of each pixel included in the kernel, and calculate a mean and a standard deviation of the calculated values of the difference. The mean and the standard deviation of the calculated values of the difference may be calculated using a general method that is widely used in a related technical field. The probabilistic model determiner 110 may determine the probabilistic model to be applied to the current pixel by applying the mean and the standard deviation of the values of the difference to a Gaussian PDF expressed as Equation 1.

Figure 5:
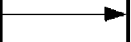
FIG. 5 illustrates an example of determining a probabilistic model to extract a modified census transform (MCT) image feature according to at least one example embodiment.

For example, when a kernel area including nine pixels is set as illustrated in FIG. 5, the probabilistic model determiner 110 may calculate a difference between a mean pixel value of the nine pixels included in the kernel and a pixel value of each pixel in the kernel. When pixel values of the nine pixels in the kernel are given as illustrated by the left portion of FIG. 5, the probabilistic model determiner 110 may calculate a value of a difference between a mean pixel value "81" of the pixels in the kernel and a pixel value of each pixel in the kernel. Values obtained by subtracting the mean pixel value 81 from pixel values of the pixels in the kernel are illustrated by the right portion of FIG. 5. The probabilistic model determiner 110 may calculate a mean and a standard deviation of the values of the difference between the pixels in the kernel, for example, −1, 19, −61, 29, −31, 129, −41, −61, and 18, and determine the probabilistic model by applying the calculated mean and the standard deviation to the probability distribution function expressed as Equation 1.

Referring back to FIG. 1, the probabilistic model determiner 110 may control a maximum probability value that may be associated with the probabilistic model by applying a weighted value to the probabilistic model. For example, the probabilistic model determiner 110 may adjust the maximum probability value of the probabilistic model by multiplying Equation 1 by the weighted value, which is a constant. A detailed description will be provided with reference to FIG. 3.

The image feature determiner 120 may determine the image feature information of the MCT image feature of the current pixel. The image feature determiner 120 may determine the image feature information of the current pixel by comparing the mean pixel value of the pixels included in the kernel to the pixel value of the current pixel. For example, when the pixel value of the current pixel is greater than the mean pixel value of the pixels included in the kernel, the image feature determiner 120 may set the image feature information of the current pixel to be "1." Conversely, when the pixel value of the current pixel is less than or equal to the mean pixel value of the pixels included in the kernel, the image feature determiner 120 may set the image feature information of the current pixel to be "0."

When the image feature information of the current pixel is determined, the image feature determiner 120 may determine whether to change the image feature information determined with respect to the current pixel based on the probabilistic model determined by the probabilistic model determiner 110. When the probability value of the current pixel determined based on the probabilistic model satisfies a predetermined and/or selected condition, the image feature determiner 120 may change the image feature information determined with respect to the current pixel. Conversely, when the probability value of the current pixel does not satisfy the predetermined and/or selected condition, the image feature determiner 120 may maintain the image feature information of the current pixel.

The image feature determiner 120 may determine whether to change the image feature information of the current pixel by comparing, to the random value, the probability value of the current pixel determined based on the probabilistic model. The probability value of the current pixel may be determined by applying, to the probabilistic model, the value of the difference between the mean pixel value of the pixels included in the kernel and the pixel value of the current pixel and the weighted value. For example, the value of the difference between the mean pixel value of the pixels included in the kernel and the pixel value of the current pixel may be input as the variable x of Equation 1, and a value obtained by multiplying a resulting value from Equation 1 by the weighted value may be determined to be the probability value of the current pixel.

When the probability value of the current pixel is greater than the random value, the image feature determiner 120 may change the image feature information determined with respect to the current pixel. Conversely, when the probability value of the current pixel is less than or equal to the random value, the image feature determiner 120 may maintain the image feature information determined with respect to the current pixel. For example, when the image feature information about the MCT image feature determined with respect to the current pixel is "1" and the probability value of the current pixel determined based on the probabilistic model is greater than the random value, the image feature determiner 120 may change the image feature information of the current pixel to be an inverse value "0." Conversely, when the probability value of the current pixel is less than or equal to the random value, the image feature determiner 120 may maintain the image feature information of the current pixel to be "1" and perform an operation of determining an MCT image feature of another pixel.

When the MCT image feature of the current pixel is determined, the image feature extracting apparatus 100 may determine an MCT image feature of other pixels in the kernel. When the MCT image feature of all pixels in the kernel is determined, the image feature extracting apparatus 100 may determine an MCT image feature of pixels included in another kernel.

<Example of Determining a HOG Image Feature by the Image Feature Extracting Apparatus 100>

The probabilistic model determiner 110 may determine the probabilistic model to be applied to the current pixel. For example, the probabilistic model determiner 110 may determine a Gaussian PDF or a normal distribution function with a mean of 0 and a standard deviation of 1 to be the probabilistic model to be applied to the current pixel. For example, the probabilistic model determiner 110 may input the mean of 0 and the standard deviation of 1 to Equation 1 to determine the probabilistic model to be applied to the current pixel. The probabilistic model determiner 110 may control a maximum probability value that may be associated with the probabilistic model by applying a weighted value to the probabilistic model. For example, the probabilistic model determiner 110 may adjust the maximum probability value of the probabilistic model by multiplying Equation 1 by the weighted value, which is a constant. A detailed description will be provided with reference to FIG. 3.

The image feature determiner 120 may extract a HOG image feature from an input image. The image feature determiner 120 may determine a size of a mask to be applied to the input image including the current pixel. For example, the image feature determiner 120 may determine any type of the mask to be applied to the input image from among mask types, for example, a one-dimensional (1D) centered type, a 1D uncentered type, a 1D cubic-corrected type, a 2×2 diagonal type, and a 3×3 Sobel type.

When the size of the mask is determined, the image feature determiner 120 may determine a gradient angle and a gradient magnitude of the current pixel based on a result of convolution between the input image and the mask. For example, the image feature determiner 120 may determine the gradient angle and the gradient magnitude with respect to a brightness value of the current pixel using a 3×3 Sobel mask in an X direction and a Y direction. The gradient angle and the gradient magnitude of the current pixel may be indicated as a vector. For example, the gradient angle and the gradient magnitude of the current pixel may be indicated as the vector in which the gradient angle is an angle with respect to a horizontal direction, or an x axis, from a position of the current pixel and the gradient magnitude is a magnitude of the vector.

For example, the image feature determiner 120 may determine the gradient magnitude of the current pixel based on Equation 2, and the gradient angle of the current pixel based on Equation 3.

$$\text{magnitude}(x, y) = \sqrt{dx(x, y)^2 + dy(x, y)^2} \quad \text{[Equation 2]}$$

$$\theta(x, y) = \quad \text{[Equation 3]}$$
$$\begin{cases} \tan^{-1}\left(\frac{dy(x, y)}{dx(x, y)}\right) - \pi & \text{If } dx(x, y) < 0 \text{ and } dy(x, y) < 0 \\ \tan^{-1}\left(\frac{dy(x, y)}{dx(x, y)}\right) + \pi & \text{If } dx(x, y) < 0 \text{ and } dy(x, y) > 0 \\ \tan^{-1}\left(\frac{dy(x, y)}{dx(x, y)}\right) & \text{otherwise} \end{cases}$$

In Equation 2, "magnitude(x,y)" denotes the gradient magnitude of the current pixel present at a (x,y) position in the input image. "dx(x,y)" denotes a gradient in an x direction from the current pixel, and "dy(x,y)" denotes a gradient in a y direction from the current pixel. In Equation 3, "θ(x, y)" denotes the gradient angle of the current pixel present at a (x,y) position in the input image. The θ(x, y) may have an angle in a range between 0 and π (radians).

The image feature determiner 120 may determine a bin, or a rank, corresponding to the gradient angle of the current pixel in a histogram to determine the HOG image feature. The histogram may be generated based on a gradient angle and a gradient magnitude determined with respect to a plurality of pixels. A horizontal axis of the histogram may indicate the gradient angle, and a longitudinal axis of the histogram may indicate a frequency according to the gradient magnitude. A gradient angle range expressed in the histogram, for example, a range between 0 and π (radians), may be divided into a predetermined number of sections, for example, bins. For example, the histogram in which a section in which a gradient angle is quantized to be eight bins is indicated as the horizontal axis and a sum of gradient magnitudes with respect to the quantized gradient angle is indicated as the longitudinal axis may be generated. The image feature determiner 120 may determine the bin corresponding to the gradient angle of the current pixel from among the bins with respect to the gradient angle in the generated histogram.

The image feature determiner 120 may then determine whether to re-determine a bin corresponding to the current pixel based on the probabilistic model. The image feature determiner 120 may determine whether to re-determine the bin corresponding to the gradient angle of the current pixel based on the probability value of the probabilistic model to which the gradient magnitude of the current pixel is applied. The probability value of the current pixel may be a value to which a weighted value is applied. For example, the probability value of the current pixel may be a value obtained by multiplying, by the weight value, a value obtained by inputting, as a variable, the gradient magnitude of the current pixel to a Gaussian PDF with a mean of 0 and a standard deviation of 1.

The image feature determiner 120 may determine whether to re-determine the bin corresponding to the gradient angle of the current pixel by comparing the probability value of the current pixel to the random value. When the probability value of the current pixel is greater than the random value, the image feature determiner 120 may re-determine the bin corresponding to the gradient angle of the current pixel. Conversely, when the probability value of the current pixel is less than or equal to the random value, the image feature determiner 120 may maintain the bin corresponding to the gradient angle of the current pixel.

When the bin corresponding to the gradient angle of the current pixel is finally determined, the image feature determiner 120 may determine a HOG image feature of other pixels in the input image. Histograms generated from a plurality of areas in the input image may be indicated as line segments indicating corresponding edge strength distributions. An edge strength distribution of the input image may be identified based on the line segments.

Figure 2:
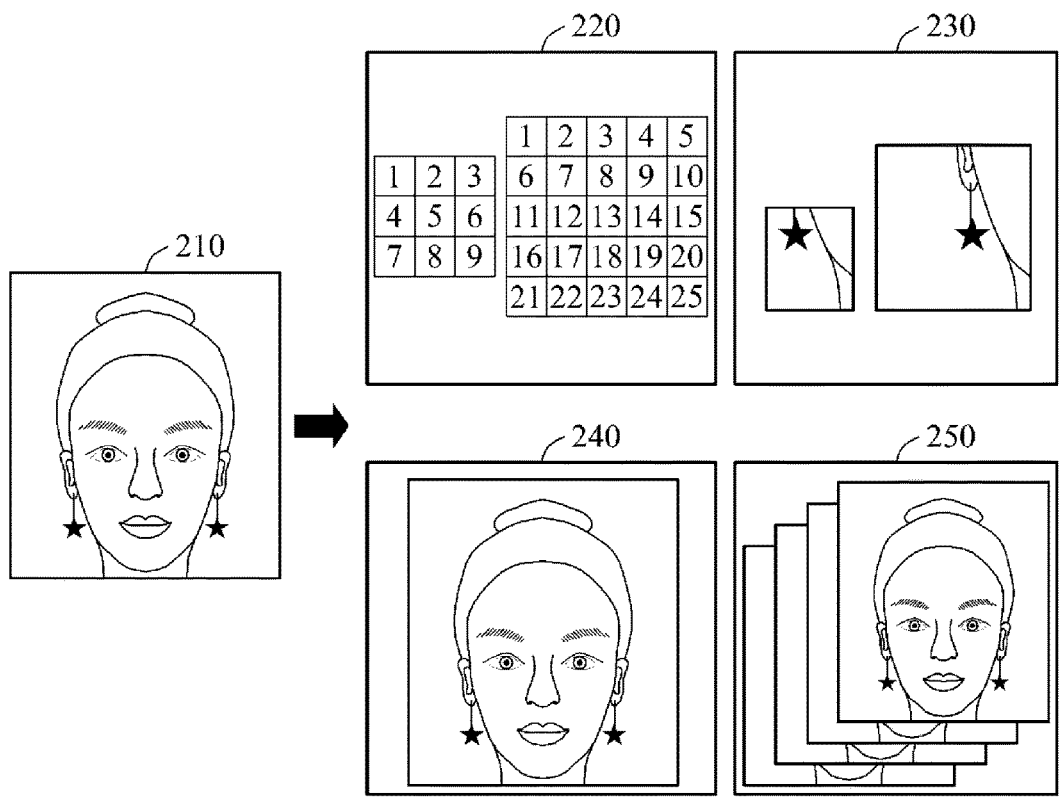
FIG. 2 illustrates area sampling based on a size of a kernel according to at least one example embodiment.

FIG. 2 illustrates area sampling based on a size of a kernel according to at least one example embodiment.

An image feature extracting apparatus may use a kernel to determine a probabilistic model from an input image 210. An area to be used to generate the probabilistic model may be sampled based on the kernel. The area may be sampled in a unit of a patch from the input image 210 based on a size of the kernel as illustrated in 220 of FIG. 2. A local region may be sampled from the input image 210 as illustrated in 230 of FIG. 2. The entire input image 210 may be sampled as illustrated in 240 of FIG. 2. Alternatively, a plurality of images, for example, image frames included in a video, including the input image 210 may be sampled as illustrated in 250 of FIG. 2. When the images are sampled, a mean and a standard deviation to be applied to the probabilistic model may be determined based on pixel values of pixels included in the images.

Figure 3:
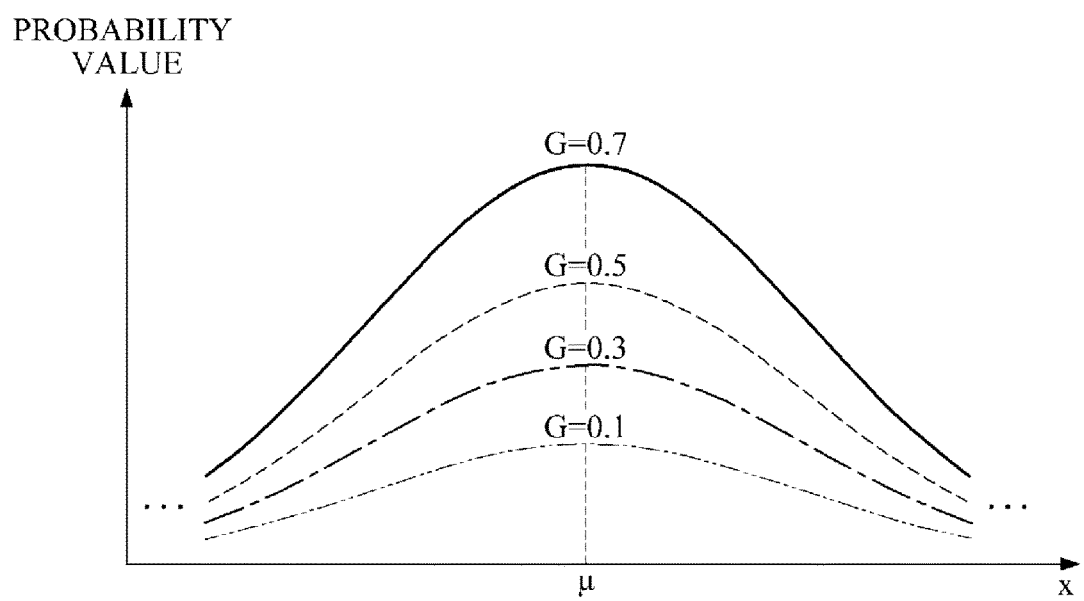
FIG. 3 illustrates an example of a probabilistic model to which a weighted value is applied according to at least one example embodiment.

FIG. 3 illustrates an example of a probabilistic model to which a weighted value is applied according to at least one example embodiment.

A maximum probability value that may be associated with the probabilistic model may be determined based on the weighted value. For example, when the probabilistic model is a Gaussian PDF having a maximum probability value when a variable "x" is a mean μ, the maximum probability value of the Gaussian PDF may vary depending on a weighted value "G" to be applied to the probabilistic model. When G decreases, the maximum probability value of the Gaussian PDF may decrease. Image feature information of an input image may be determined based on a probabilistic model and thus, the determined image feature information may not be identical despite identical values of G.

Figure 6:
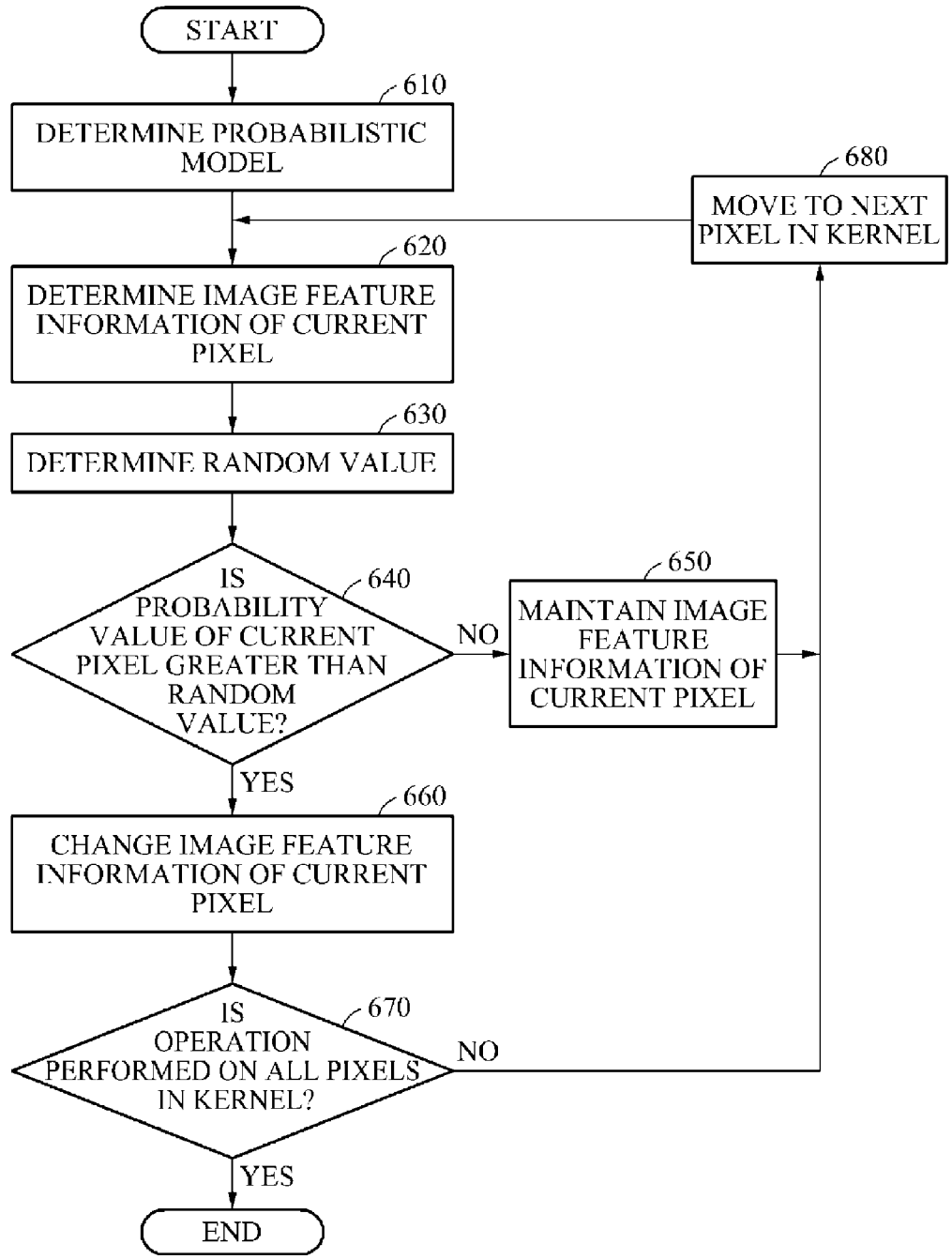
FIG. 6 is a flowchart illustrating an example of an image feature extracting method according to at least one example embodiment.

FIG. 6 is a flowchart illustrating an example of an image feature extracting method according to at least one example embodiment. The image feature extracting method may be performed by an image feature extracting apparatus (e.g., the image feature extracting apparatus 106).

Referring to FIG. 6, in operation 610, the image feature extracting apparatus determines a probabilistic model to be applied to a current pixel. The image feature extracting apparatus may perform sampling on a predetermined area based on a kernel, and determine the probabilistic model based on a pixel value of each pixel included in the kernel. The image feature extracting apparatus may adjust a maximum probability value that may be associated with the probabilistic model by applying a weighted value to the probabilistic model.

In an example, when the image feature extracting apparatus extracts an LBP image feature from an input image, the image feature extracting apparatus may determine a probability parameter based on a difference between a pixel value of a central pixel located at a center of the kernel and a pixel value of each pixel included in the kernel, and determine the probabilistic model to be applied to the current pixel by applying the determined probability parameter to a probability distribution function, for example, a Gaussian PDF and a normal distribution function.

In another example, when the image feature extracting apparatus extracts an MCT image feature from an input image, the image feature extracting apparatus may determine a probability parameter based on a difference between a mean pixel value of pixels included in the kernel and a pixel value of each pixel included in the kernel, and determine the probabilistic model to be applied to the current pixel by applying the determined probability parameter to the probability distribution function, for example, the Gaussian PDF and the normal distribution function.

In operation 620, the image feature extracting apparatus determines image feature information of the current pixel.

In an example, when the image feature extracting apparatus extracts an LBP image feature, the image feature extracting apparatus may determine the image feature information of the current pixel by comparing the pixel value of the central pixel located at the center of the kernel to a pixel value of the current pixel. When the pixel value of the current pixel is greater than the pixel value of the central pixel, the image feature extracting apparatus may set the image feature information of the current pixel to be "1." In other cases, the image feature extracting apparatus may set the image feature information of the current pixel to be "0."

In another example, when the image feature extracting apparatus extracts an MCT image feature, the image feature extracting apparatus may determine the image feature information of the current pixel by comparing the mean pixel value of the pixels included in the kernel to the pixel value of the current pixel. When the pixel value of the current pixel is greater than the mean pixel value of the pixels included in the kernel, the image feature extracting apparatus may set the image feature information of the current pixel to be "1." In other cases, the image feature extracting apparatus may set the image feature information of the current pixel to be "0."

In operation 630, the image feature extracting apparatus determines a random value. The random value may be determined based on a uniform distribution and in a range between 0 and a maximum probability value that may be associated with the probabilistic model.

In operation 640, the image feature extracting apparatus determines whether to change the image feature information of the current pixel by comparing a probability value of the current pixel to the random value.

When the probability value of the current pixel is less than or equal to the random value, the image feature extracting apparatus maintains the image feature information of the current pixel in operation 650. Conversely, when the probability value of the current pixel is greater than the random value, the image feature extracting apparatus changes the image feature information of the current pixel in operation 660. The image feature extracting apparatus may change the image feature information of the current pixel to a value inverse to a previously determined value. For example, when the image feature information set with respect to the current pixel indicates "0," the image feature extracting apparatus may change the image feature information of the current pixel to be "1." Conversely, when the image feature information set with respect to the current pixel indicates "1," the image feature extracting apparatus may change the image feature information of the current pixel to be "0."

In operation 670, the image feature extracting apparatus determines whether operations 610 through 660 are performed on all pixels in the kernel.

When pixel values are not determined with respect to all pixels in the kernel, the image feature extracting apparatus may re-perform operations 610 through 660 on a next pixel in the kernel in operation 680.

Figure 7:
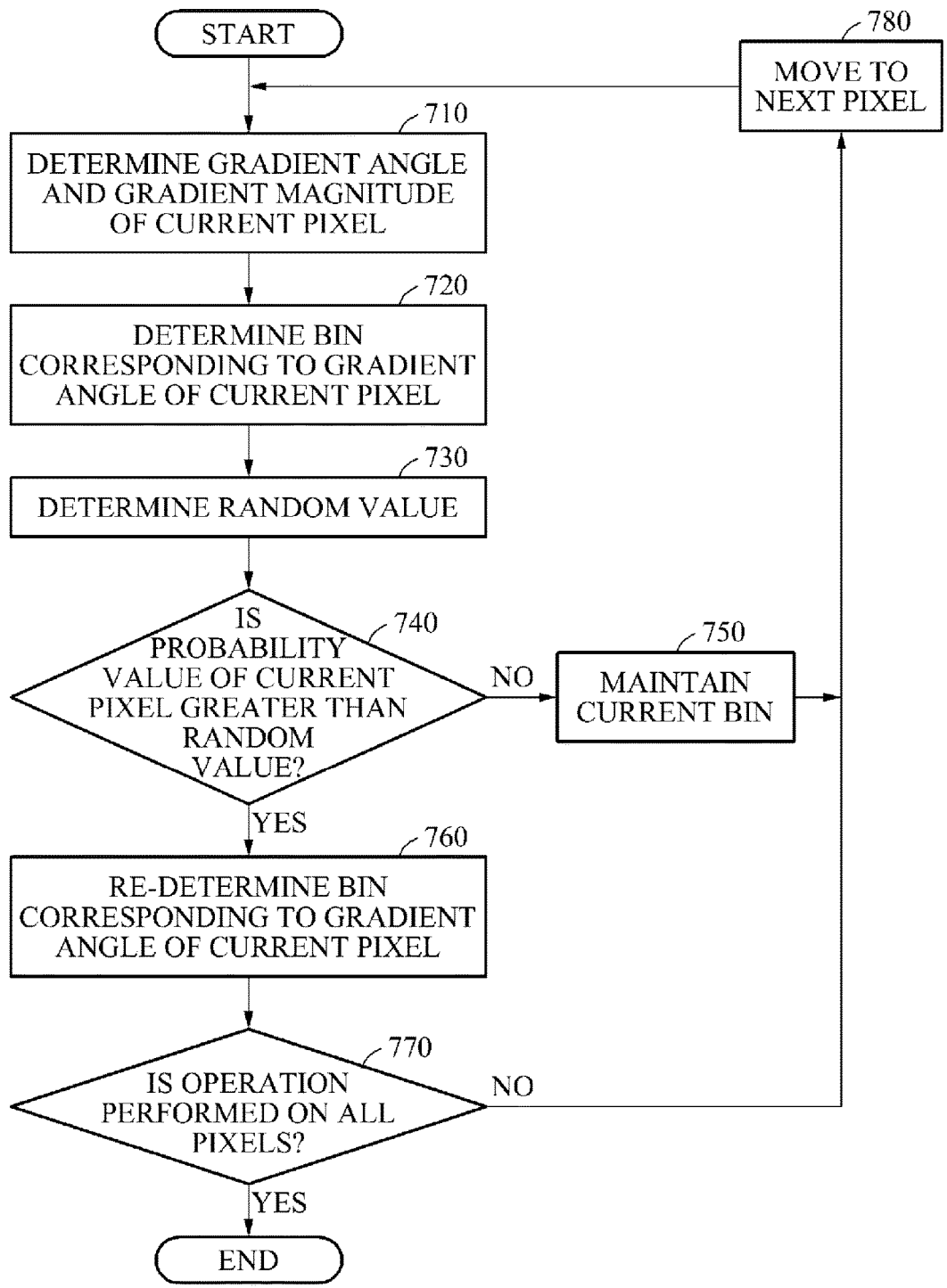
FIG. 7 is a flowchart illustrating another example of an image feature extracting method according to at least one example embodiment.

FIG. 7 is a flowchart illustrating another example of an image feature extracting method according to at least one example embodiment. The image feature extracting method may be performed by an image feature extracting apparatus (e.g., the image feature extracting apparatus 100).

Referring to FIG. 7, in operation 710, the image feature extracting apparatus determines a gradient angle and a gradient magnitude of a current pixel. The image feature extracting apparatus may determine the gradient angle and the gradient magnitude of the current pixel based on a result of convolution between an input image and a mask.

In operation 720, the image feature extracting apparatus determines a bin corresponding to the gradient angle of the current pixel in a histogram to determine a HOG image feature.

In operation 730, the image feature extracting apparatus determines a random value. The random value may be determined based on a uniform distribution and in a range between 0 and a maximum probability value that may be associated with a probabilistic model.

In operation 740, the image feature extracting apparatus determines whether to re-determine a bin corresponding to the gradient angle of the current pixel by comparing a probability value of the current pixel to the random value.

When the probability value of the current pixel is less than or equal to the random value, the image feature extracting apparatus maintains the current bin corresponding to the gradient angle of the current pixel in operation 750. Conversely, when the probability value of the current pixel is greater than the random value, the image feature extracting apparatus re-determines the bin corresponding to the gradient angle of the current pixel in operation 760. For example, the image feature extracting apparatus may re-determine the bin corresponding to the gradient angle of the current pixel in the histogram using a normal random deviation.

In operation 770, the image feature extracting apparatus determines whether operations 710 through 760 are performed on all pixels in the input image.

When a pixel on which operations 710 through 760 are not performed is present in the input image, the image feature extracting apparatus may re-perform operations 710 through 760 on a subsequent pixel in operation 780.

Figure 8:
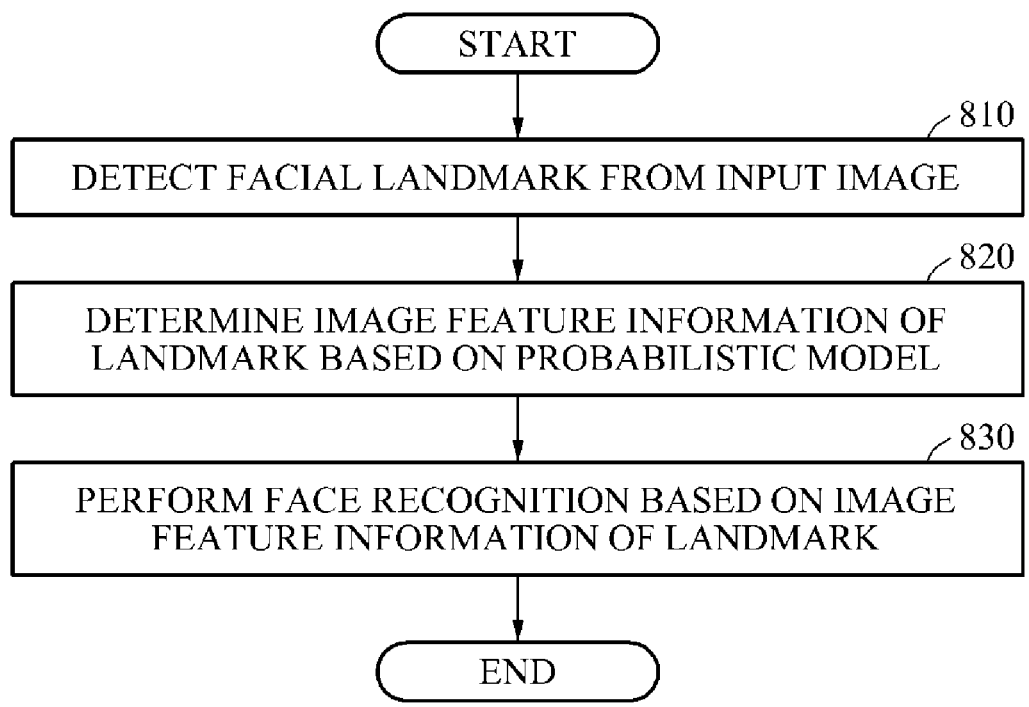
FIG. 8 is a flowchart illustrating an example of a face recognition method according to at least one example embodiment.

FIG. 8 is a flowchart illustrating an example of a face recognition method according to at least one example embodiment. The face recognition method may be performed by a recognizer including the image feature extracting apparatus 100 illustrated in FIG. 1.

Referring to FIG. 8, in operation 810, the recognizer detects a facial landmark from an input image. The recognizer may detect a facial region of a user from the input image and detect the landmark from the facial region. The facial landmark may be a local feature of a face of the user and include, for example, both ends of eyes, both ends of eyebrows, a nose tip, and both ends of lips.

In operation 820, the recognizer determines image feature information of the landmark detected in operation 810 based on a probabilistic model. For example, the recognizer may determine the image feature information of the landmark, for example, an LBP, an MCT, and a HOG, using the probabilistic model based on a Gaussian PDF and a normal distribution function.

In an example, the recognizer may determine the image feature information of the landmark, for example, the LBP, the MCT, and the HOG, based on a pixel value of a pixel included in a region of the landmark. The recognizer may then determine whether to change the determined image feature information based on the probabilistic model. The recognizer may determine a probability value of a current landmark based on a probabilistic model, and determine whether to determine image feature information determined with respect to the current landmark by comparing the determined probability value to a random value. When the determined probability value is greater than the random value, the recognizer may determine to change the image feature information of the landmark. Conversely, when the probability value is less than or equal to the random value, the recognizer may determine to maintain the image feature information determined with respect to the landmark. For example, when LBP image feature information initially determined with respect to the current landmark is determined to have a value "1," and a probability value determined based on the probabilistic model is greater than the random value, the recognizer may change the image feature information of the landmark from "1" to "0." The recognizer may adjust a maximum probability value that may be associated with the probabilistic model by applying a weighted value to the probabilistic model. The random value may be randomly determined based on a uniform distribution.

A process of determining the image feature information of the landmark may be performed by the image feature extracting apparatus 100 included in the recognizer and thus, reference may be made to the descriptions provided with respect to FIGS. 1 through 7.

In operation 830, the recognizer performs face recognition based on the image feature information of the landmark. The recognizer may recognize the face of the user exhibited on the input image by comparing image feature information of landmarks determined through operation 820 to pre-stored user information. For example, the recognizer may calculate a similarity between the image feature information of the landmarks determined from the input image and pre-stored user image feature information. When the calculated similarity is greater than a predetermined condition, the face recognition performed to recognize the face exhibited on the input image may be determined a success. However, in other cases, the face recognition may be determined to be a failure.

The units and/or modules, such as the probabilistic model determiner 110 and the image feature determiner 120, described herein may be implemented using hardware components and/or hardware executing software components stored on a memory. For example, the hardware components may include microphones, amplifiers, band-pass filters, audio to digital convertors, and processing devices. A processing device may be implemented using one or more hardware device configured to carry out and/or execute program code by performing arithmetical, logical, and input/output operations. The processing device(s) may include a processor, a controller and an arithmetic logic unit, a digital signal processor, a microcomputer, a field programmable array, a programmable logic unit, a microprocessor or any other device capable of responding to and executing instructions in a defined manner. The processing device may run an operating system (OS) and one or more software applications that run on the OS. The processing device also may access, store, manipulate, process, and create data in response to execution of the software. For purpose of simplicity, the description of a processing device is used as singular; however, one skilled in the art will appreciated that a processing device may include multiple processing elements and multiple types of processing elements. For example, a processing device may include multiple processors or a processor and a controller. In addition, different processing configurations are possible, such a parallel processors.

The software may include a computer program, a piece of code, an instruction, or some combination thereof, to independently or collectively instruct and/or configure the processing device to operate as desired, thereby transforming the processing device into a special purpose processor. Software and data may be embodied permanently or temporarily in any type of machine, component, physical or virtual equipment, computer storage medium or device, or in a propagated signal wave capable of providing instructions or data to or being interpreted by the processing device. The software also may be distributed over network coupled computer systems so that the software is stored and executed in a distributed fashion. The software and data may be stored by one or more non-transitory computer readable recording mediums.

The methods according to the above-described example embodiments may be recorded in non-transitory computer-readable media including program instructions to implement various operations of the above-described example embodiments. The media may also include, alone or in combination with the program instructions, data files, data structures, and the like. The program instructions recorded on the media may be those specially designed and constructed for the purposes of example embodiments, or they may be of the kind well-known and available to those having skill in the computer software arts. Examples of non-transitory computer-readable media include magnetic media such as hard disks, floppy disks, and magnetic tape; optical media such as CD-ROM discs, DVDs, and/or Blue-ray discs; magneto-optical media such as optical discs; and hardware devices that are specially configured to store and perform program instructions, such as read-only memory (ROM), random access memory (RAM), flash memory (e.g., USB flash drives, memory cards, memory sticks, etc.), and the like. Examples of program instructions include both machine code, such as produced by a compiler, and files containing higher level code that may be executed by the computer using an interpreter. The above-described devices may be configured to act as one or more software modules in order to perform the operations of the above-described example embodiments, or vice versa.

A number of examples have been described above. Nevertheless, it should be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. An image feature extracting method, comprising:
   determining a probabilistic model based on pixel values of pixels in a kernel;
   determining image feature information of a current pixel of the pixels in the kernel; and
   determining whether to change the image feature information of the current pixel based on a random value and a probability value of the current pixel, the probability value being based on the probabilistic model.

2. The method of claim 1, wherein the determining the probabilistic model comprises:
   determining a probability parameter based on a difference between a pixel value of a central pixel of the pixels and a pixel value of each pixel of the pixels in the kernel, the central pixel being at a center of the kernel; and
   determining the probabilistic model by applying the probability parameter to a probability distribution function.

3. The method of claim 1, the probability value of the current pixel is based on a value of a difference between a pixel value of a central pixel of the pixels and a pixel value of the current pixel, a weighted value and the probabilistic model, the central pixel being at a center of the kernel.

4. The method of claim 1, wherein the determining the image feature information comprises:
   determining the image feature information of the current pixel by comparing a pixel value of a central pixel of the pixels to a pixel value of the current pixel, the central pixel being at a center of the kernel.

5. The method of claim 1, wherein the determining the probabilistic model comprises:
   determining a probability parameter based on a difference between a mean pixel value of the pixels in the kernel and a pixel value of each pixel of the pixels in the kernel; and
   determining the probabilistic model by applying the probability parameter to a probability distribution function.

6. The method of claim 1, wherein the probability value of the current pixel is based on a value of a difference between a mean pixel value of the pixels in the kernel and a pixel value of the current pixel, a weighted value and the probabilistic model.

7. The method of claim 1, wherein the determining of the image feature information comprises:
   determining the image feature information of the current pixel based on a mean pixel value of the pixels in the kernel and a pixel value of the current pixel.

8. The method of claim 1, wherein the determining whether to change the image feature information of the current pixel comprises:
   changing the image feature information of the current pixel if the probability value of the current pixel is greater than the random value.

9. The method of claim 1, wherein the determining whether to change the image feature information of the current pixel comprises:
   maintaining the image feature information of the current pixel if the probability value of the current pixel is less than or equal to the random value.

10. The method of claim 1, wherein the determining the probabilistic model comprises:
    determining the probabilistic model using one of a Gaussian probability distribution function and a normal distribution function.

11. A non-transitory computer-readable medium comprising program code that, when executed by a processor, performs the method of claim 1.

12. The method of claim 1, wherein the determining the image feature information determines the image feature information after the determining the probabilistic model.

13. The method of claim 1, further comprising:
    applying a weight to the probabilistic model, the probability value being based on the weighted probabilistic model.

* * * * *